United States Patent [19]
Bowler

[11] 3,788,422
[45] Jan. 29, 1974

[54] ANTI-THEFT SYSTEM INCLUDING A PUSHBUTTON ELECTRONIC COMBINATION IGNITION LOCK AND TRANSMISSION SHIFT CONTROL

[75] Inventor: Lauren L. Bowler, Bloomfield Hills, Mich.

[73] Assignee: General Motors Corporation, Detroit, Mich.

[22] Filed: Oct. 27, 1972

[21] Appl. No.: 301,620

[52] U.S. Cl. ............... 180/114, 307/10 AT, 340/63
[51] Int. Cl. ........................................... B60r 25/06
[58] Field of Search.... 180/114; 307/10 AT; 340/63

[56] References Cited
UNITED STATES PATENTS
3,703,092  11/1972  Elliott ............................ 180/114 X
3,718,202  2/1973  Brock ................................. 180/114

Primary Examiner—Richard A. Schacher
Attorney, Agent, or Firm—Albert F. Duke

[57] ABSTRACT

A pushbutton transmission selector mechanism and electronic lock and control logic for preventing unauthorized use of a motor vehicle by locking the ignition circuit and selector mechanism until a predetermined code number is entered by the operator through the selector mechanism. The PARK pushbutton selector controls locking of the vehicle steering column and automatic application of the vehicle parking brake assembly.

10 Claims, 10 Drawing Figures

ANTI-THEFT SYSTEM INCLUDING A PUSHBUTTON ELECTRONIC COMBINATION IGNITION LOCK AND TRANSMISSION SHIFT CONTROL

This invention relates to motor vehicle control systems and more particularly to a control system for preventing unauthorized use of the vehicle.

Many automobiles presently being manufactured incorporate anti-theft features such as steering column and transmission locking arrangements which are controlled by the ignition key. The present invention is an improved anti-theft system incorporating a combination pushbutton ignition lock and shift control mechanism with the object of eliminating the ignition key and column shift selector. Another feature of the present invention is the illumination of the usual parking pawl in the automatic transmission.

Briefly, the present invention includes electronic control logic responsive to operation of a pushbutton selector mechanism for preventing starting of the vehicle or selection of a DRIVE transmission position until a predetermined combination lock number is entered by the operator. The starter and ignition circuits and the transmission selector mechanism and steering column are automatically locked when the engine is stopped and the transmission is placed in the PARK position. The control logic also includes means for periodically illuminating certain of the selector pushbuttons to draw the operator's attention to the proper sequence of pushbutton actuation. The parking brake assembly on the vehicle is automatically, hydraulically actuated in response to placing the transmission in the PARK position and is deactuated automatically by means responsive to engine manifold vacuum upon placement of the transmission in a NEUTRAL or DRIVE position.

Other objects, features, and advantages of the present invention may be had from the following detailed description which should be read in conjunction with the drawings in which.

Figure 1:
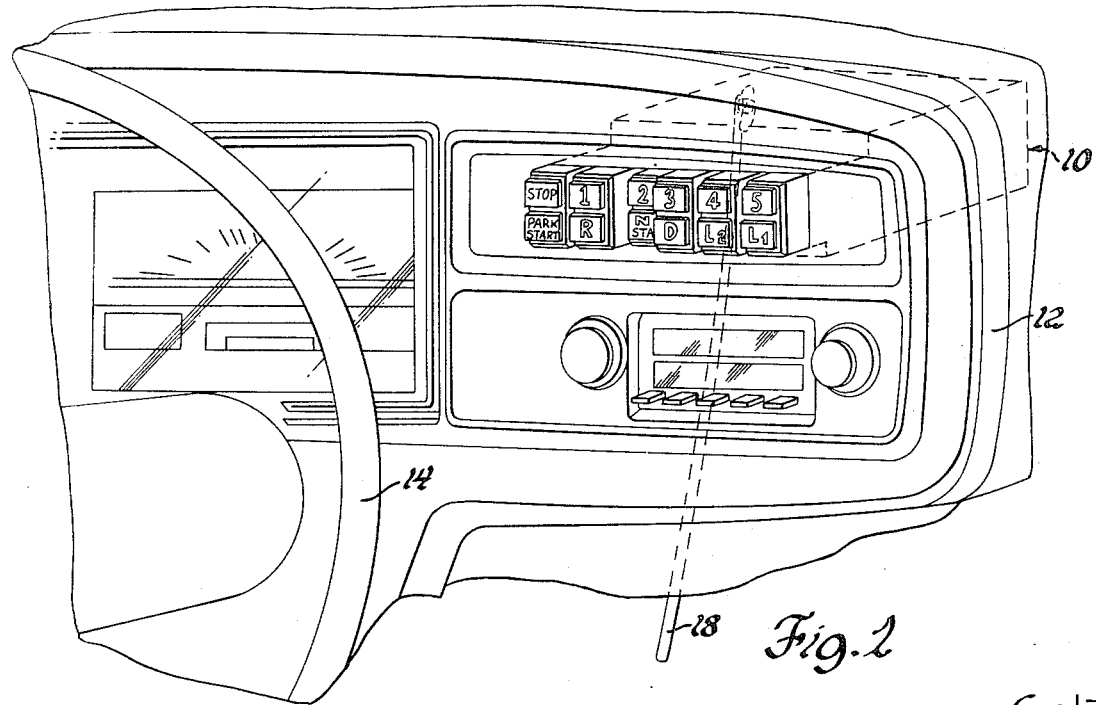
FIG. 1 is a perspective view of an automobile dashboard showing the pushbutton selector mechanism mounted therein.

Referring now to the drawings and initially to FIG. 1, a pushbutton transmission selector mechanism generally designated 10 is suitably mounted to the dashboard 12 in close proximity to the steering wheel 14 of a vehicle. The pushbutton selector mechanism is coupled to the automatic transmission 16 (FIG. 7) by means of a control cable 18 which responds to actuation of the pushbuttons to place the transmission in one of a plurality of positions. The selector mechanism 10 is shown and described as having six transmission settings or positions. The positions are designated PARK, R (Reverse), N (Neutral), and three forward DRIVE positions designated D, $L_2$, and $L_1$.

As shown in FIGS. 2–6, the selector mechanism 10 includes a box shaped casing 20 having sidewalls 22 and 24 and end walls 26 and 28. A pushbutton support housing generally designated 30 is secured to the end wall 26 and supports a plurality of pushbutton housings 32, 34, 36, 38, 40 and 42. Each of the housings 32–42 house upper pushbuttons designated STOP, 1, 2, 3, 4, and 5 respectively and lower pushbuttons designated PARK-START, R, N-START, D, $L_2$ and $L_1$ respectively. Located within the housings 32–42 are individual momentary contact switch means (not shown) actuable by the various pushbuttons. In addition, each of the numbered pushbuttons 1, 2, 3, 4 and 5 are illuminated upon energization of respective indicator lamps 43 located within the pushbutton housings 34–42. While each of the lower pushbuttons and the STOP pushbutton may be illuminated by respective indicator lamps 45a–45g (not shown) located within the pushbutton housings 32–42, the housings 32–42 are attached to the operator-actuable end of individual slide members designated 44, 46, 48, 50, 52 and 54 respectively which are biased to a deactuated position by springs 56–66 respectively. The slide members 44–54 extend through openings in the end wall 26 and are provided with guide slots 68 which engage a guide bar 80 which provides a bearing surface permitting sliding movement from the deactuated position of the slide members to an actuated position. Each of the slide members 44–54 are provided with abutment faces 82–92 (FIGS. 4 & 5) which engage a treadle mechanism generally designated 94 which actuates the control cable 18 to place the transmission in the various positions dependent on the inclination of the abutment faces on the individual slides members. Each of the slide members is provided with slots 96–106 for engagement with a latching bar 108 rotatable relative to the guide bar 80. The latching bar 108 is biased to a normal position by a spring 109 and has a latching surface 110 which engages the slots 96 formed in the slide members 44–54 as they are moved to the actuated position to releasably latch the members 44–54 in their actuated position. The latching surface 110 is engaged by the end of a slide member in moving toward the actuated position to lift the latching bar 108 out of the slot of the previously actuated slide member permitting it to return to a deactuated position. Consequently, each slide member is automatically latched in an actuated position upon movement thereto and is automatically released and returned to a deactuated position in response to actuation of another of the slide members. Attached to the end housing 28 are individual travel switches 112–122 which are actuated upon movement of the slide members 44–54 respectively to the actuated and latched position.

The housing 30 has an integral flange 124 upon which is mounted a solenoid 126 which, when energized, pivots a latch arm 128. The arm 128 is biased to a deactuated position by a spring 129. In the deactuated position the arm 128 engages the forward portions 131 and 133 of latch blocks 130 and 132 attached to the slide members 44 and 46 preventing their movement from their deactuated position. Upon energization of the solenoid 126 the latch arm is pivoted out of engagement with the latch block 130 and 132 so as to permit movement of the slide members 44 and 46 to an actuated position. Upon deenergization of the solenoid 126 while the slide member 44 is in an actuated position the latch arm 128 engages the rearward portion 135 of the latch block 130 to prevent movement of the slide member 44 from an actuated position to a deactuated position until the solenoid 126 is energized.

Figure 2:
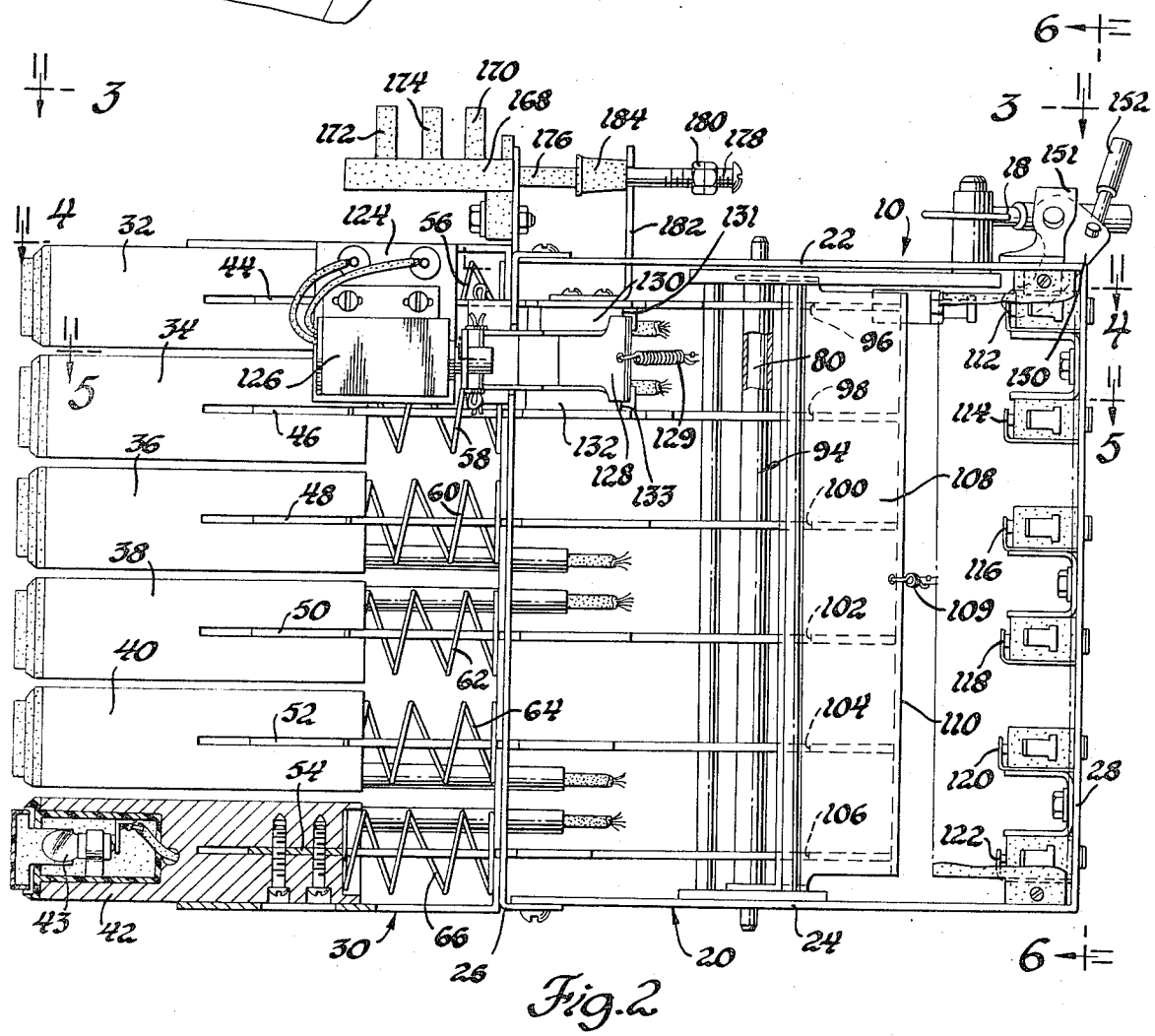
FIG. 2 is a top view partially in section of the pushbutton selector mechanism.
Figure 3:
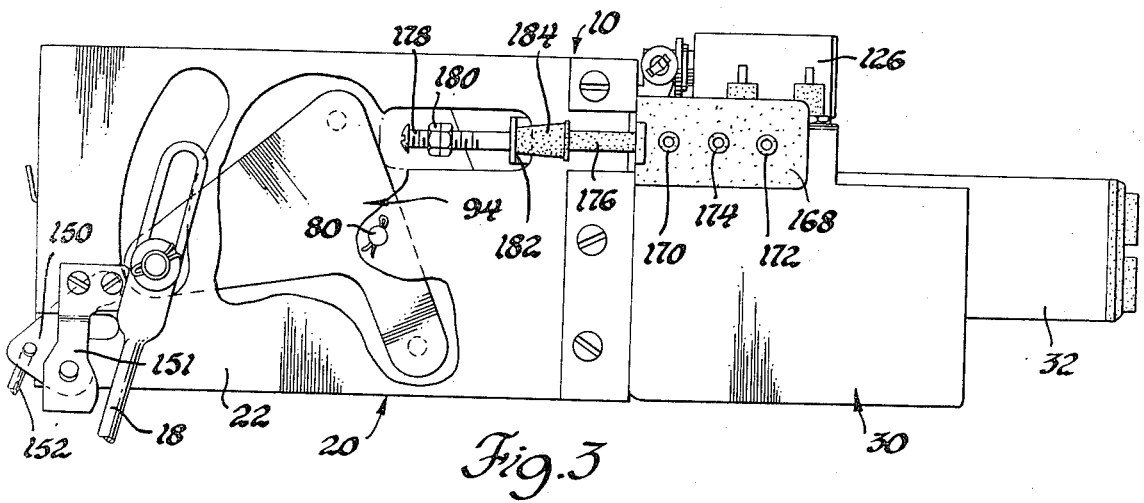
FIG. 3 is a side elevational view taken along lines 3—3 of FIG. 2.
Figure 4:
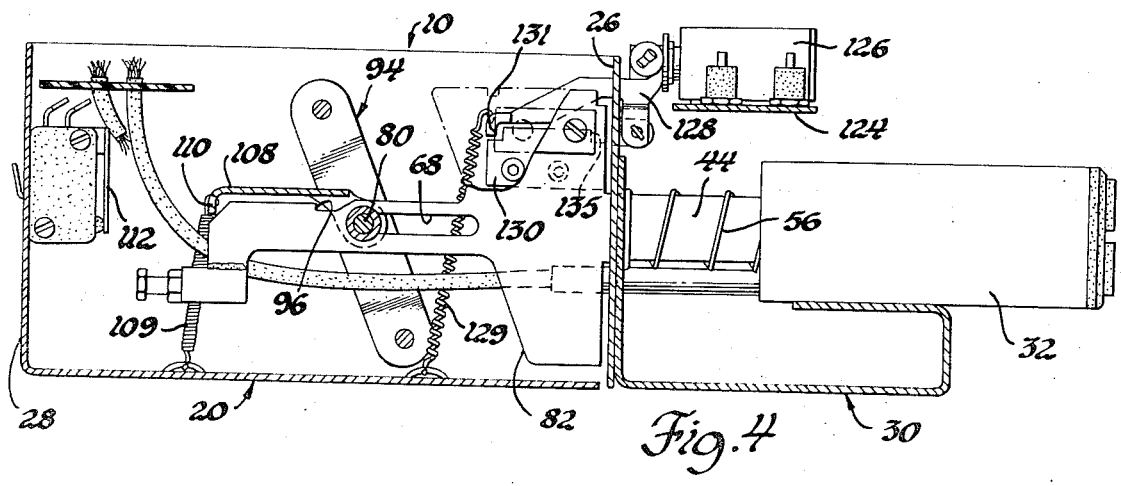
FIG. 4 is a sectional view taken along lines 4—4 of FIG. 2.
Figure 5:
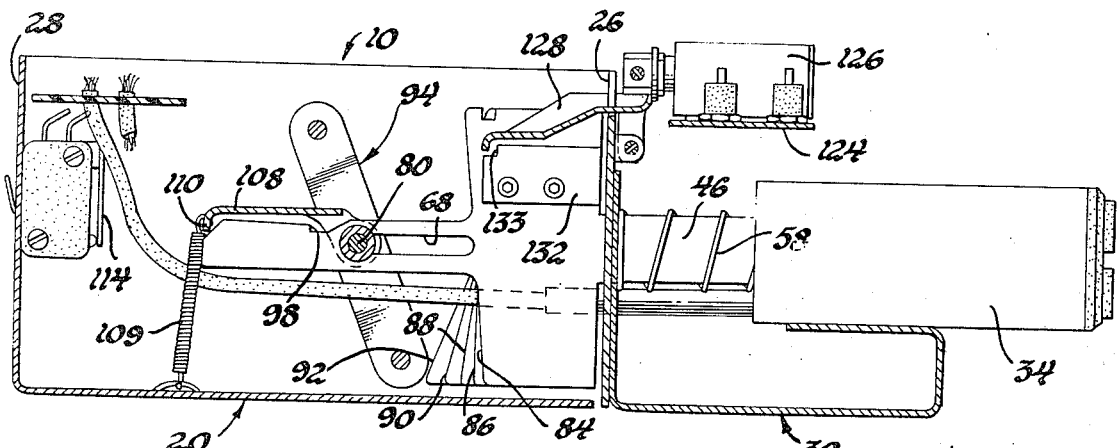
FIG. 5 is a sectional view taken along lines 5—5 of FIG. 2.
Figure 6:
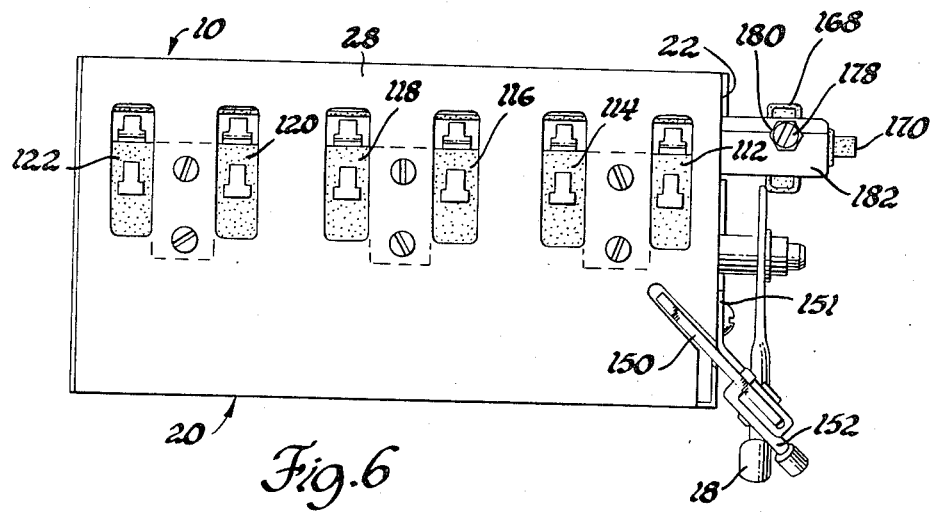
FIG. 6 is a rear elevational view taken along lines 6—6 of FIG. 2.
Figure 7:
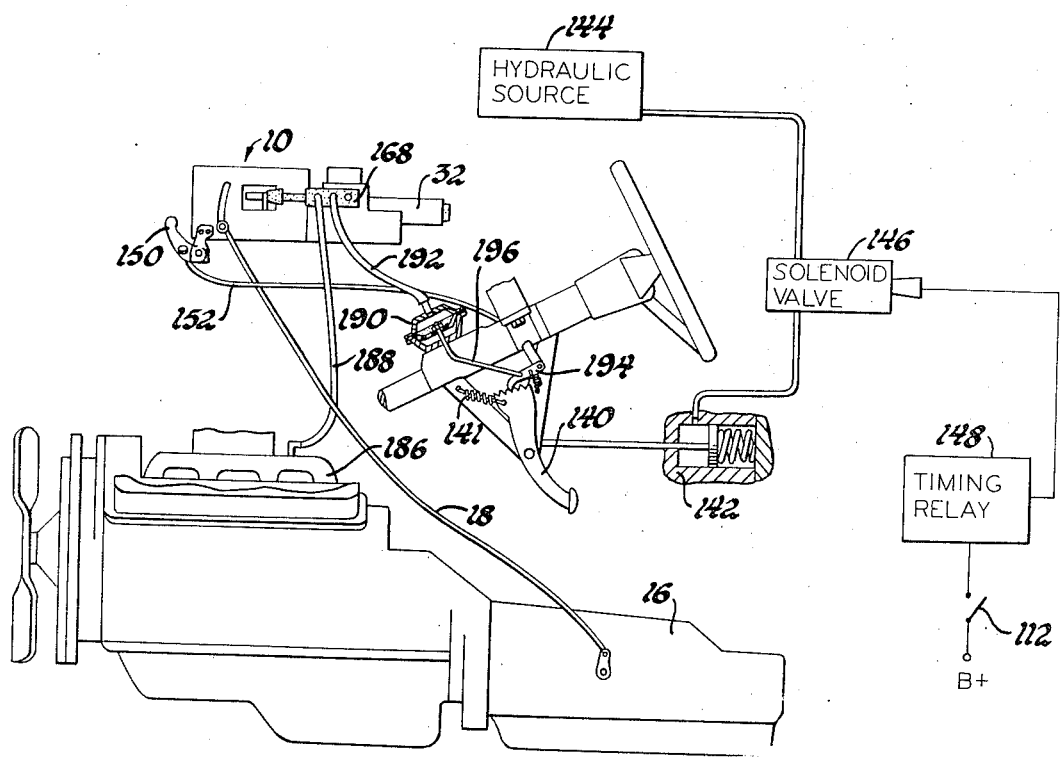
FIG. 7 is an operational schematic block diagram of the parking brake control system.
Figure 8:
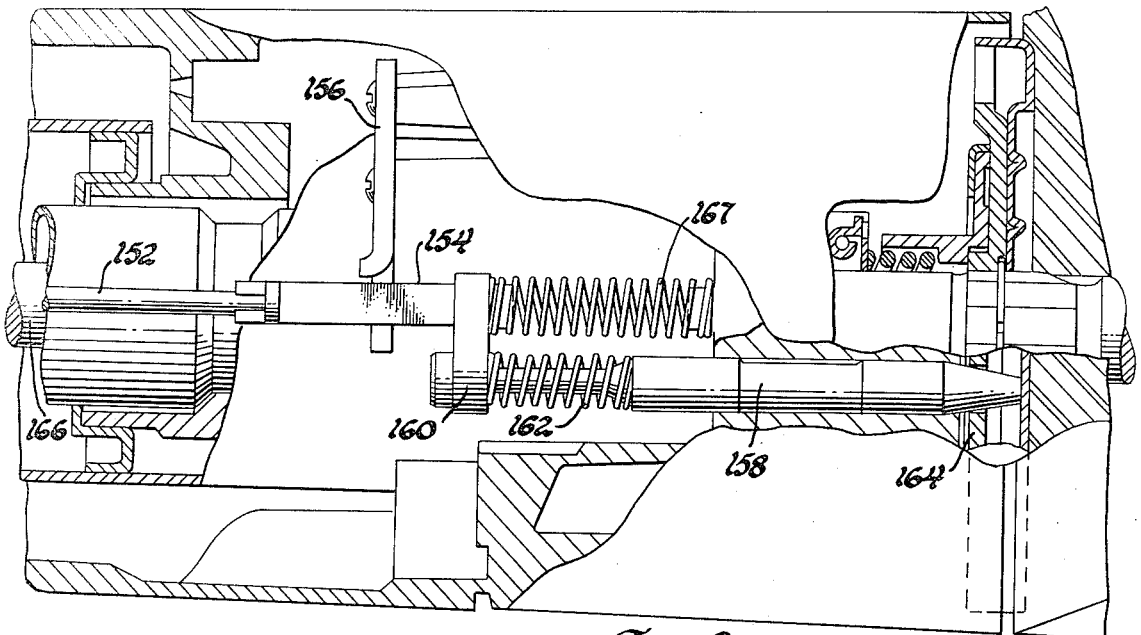
FIG. 8 is a view of the vehicle steering column with parts broken away showing the steering column locking mechanism.

Referring now to FIGS. 6, 7, and 8 the apparatus for controlling the vehicle parking brake assemblies and steering column lock will be described. The usual foot pedal 140 for operating the brake assemblies (not shown) is biased to a released position by a spring 141 and is hydraulically actuable by piston assembly 142 from a hydraulic source 144. A solenoid operated valve 146 connects the source 144 to the piston assembly 142 for a short interval of time as determined by a timing relay 148 upon closure of the switch 112 in response to deactuation of the PARK slide member 44. Thus, upon placement of the transmission in the PARK position the foot pedal 140 is automatically actuated to engage the parking brake assembly. Also, when the slide member 44 is moved to an actuated position a pivot arm 150 (FIG. 6) moves a cable 152 attached to a steering column lock actuator 154. The arm 150 is pivotally mounted to a bracket 151 which in turn is secured to the sidewall 22. The actuator 154 extends through a guide 156 and actuates a lock bolt 158 through an ear 160 and a compression spring 162 surrounding the shank of the bolt 158. The bolt 158 is shown in the actuated position extending through an opening in a keeper plate 164 which is fastened to the steering shaft 166. Thus when the bolt 158 is moved to the position shown the steering shaft 166 is locked in position. Upon movement of the PARK slide member 44 to a deactuated position, the lock bolt 158 is retracted from the opening in the keeping plate 164 by a return spring 167 thus freeing the steering shaft 162. The PARK slide member 44 also actuates a conventional vacuum switch 168 mounted to the wall 26 of the housing 22. As shown in FIG. 2 the switch 168 is provided with a manifold vacuum input port 170, an air input port 172 and an output port 174. An actuator 176 selectively connects the input ports 170 or 172 with the output port 174. The actuator 176 has a screw 178 coupled thereto which carries nuts 180. The PARK slide member 44 carries a bracket 182 which receives the screw 178 and engages the nuts 180 in moving to the actuated position to thereby connect the air input port 172 with the output port 174. Upon return of the PARK slide member 44 to the deactuated position, the bracket 182 engages an abutment 184 on the actuator 176 to connect the vacuum input port 170 with the output port 174. Referring now to FIG. 7, the vacuum input port 170 is connected with the engine manifold 186 through a line 188 while the output port 174 is connected with a servo unit 190 through a line 192. The diaphragm of the servo unit 190 is connected with a spring biased pawl 194 through a linkage 196 so that when the slide member 44 is moved to a deactuated position while the engine is running vacuum is applied to the servo unit 190 to release the foot pedal 140 thereby disengaging the parking brake assembly.

Figure 9:
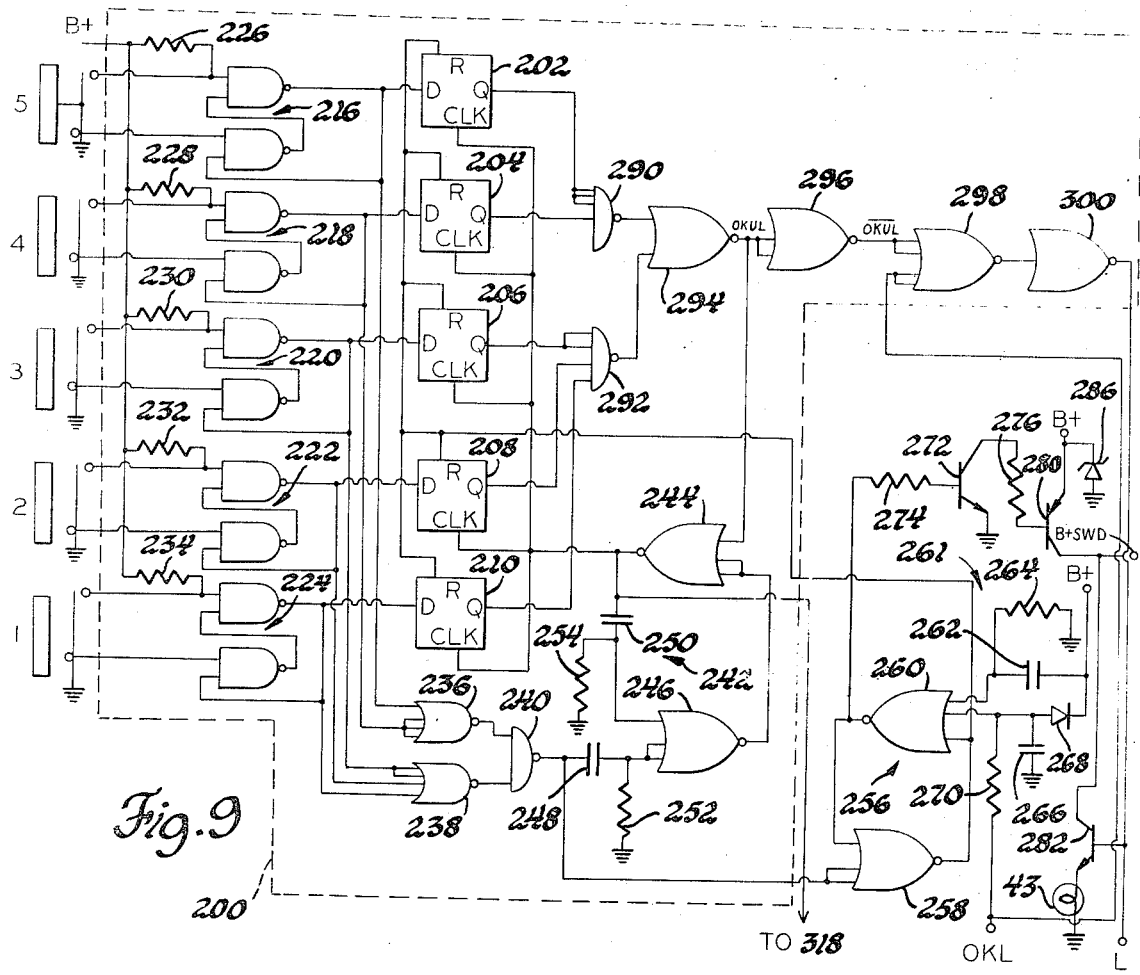
FIGS. 9 and 9a are a logic diagram of the electronic control system.
Figure 9A:
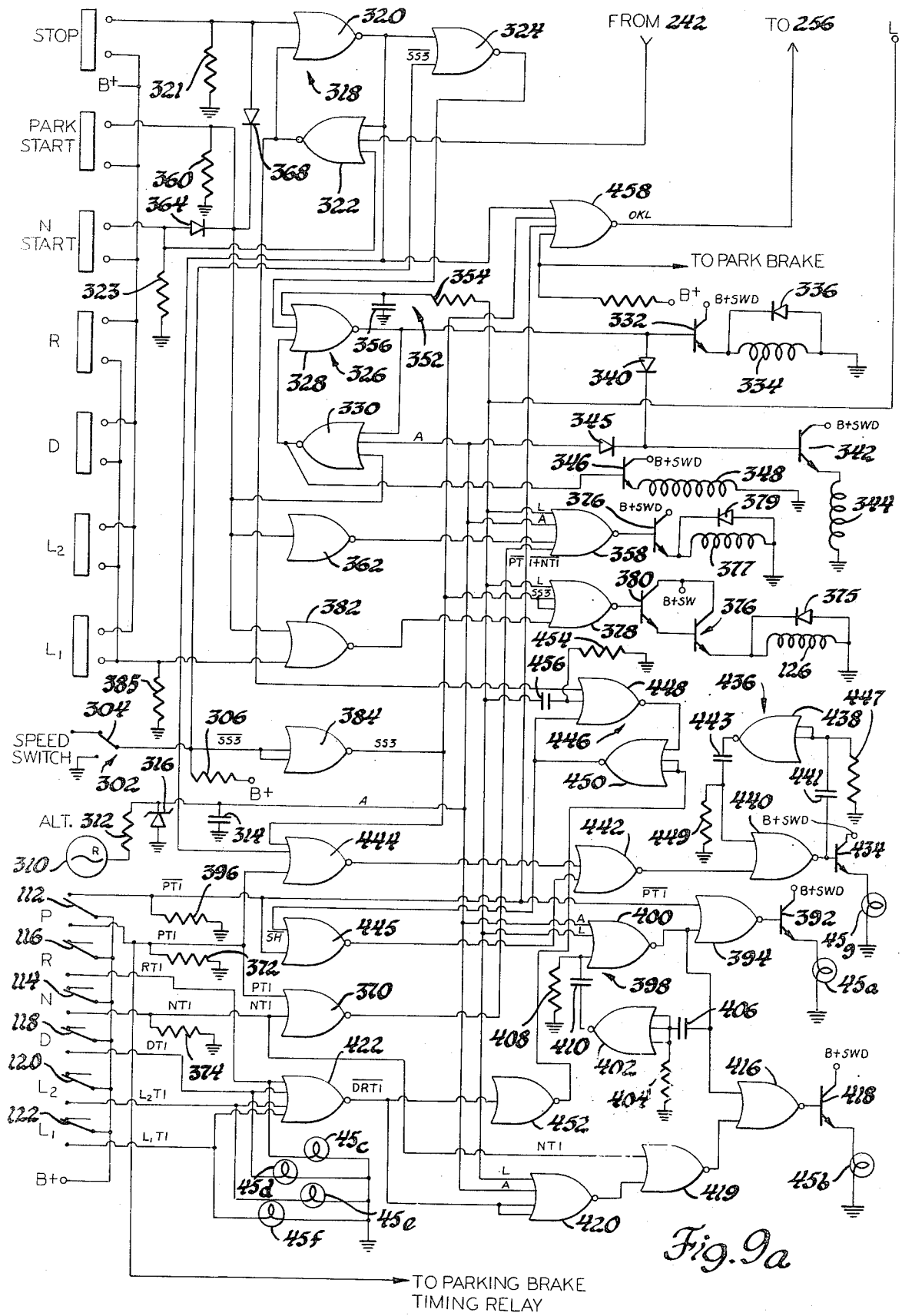

Referring now to FIGS. 9 and 9a, control circuitry responsive to actuation of the various pushbuttons for controlling starting, stopping, and latching of the slide members 44 and 46 is disclosed. The control circuitry includes combination lock circuitry generally designated 200 which develops an output signal designated L which switches from a LOCKED logic level to an UNLOCKED logic level in response to actuation of the numbered pushbuttons 1, 2, 3, 4, and 5 in a predetermined sequence.

The combination lock circuitry 200 comprises registers 202–210. The input to the registers 202–210 are from the individually numbered pushbuttons 54321 respectively through bounce elimination circuitry comprising flip-flops 216–224 respectively. The output of the flip-flops 216–224 are normally maintained low as a result of the pull-up resistors 226–234 connected with a source of direct current potential such as the vehicle battery and designated B+. Upon actuation of any of the pushbuttons 54321, the flip-flop connected therewith is switched so that its output goes high. The output of the flip-flops 216–224 are connected as inputs to NOR gates 236 and 238 the outputs of which are connected as inputs to NAND gate 240. The output of gate 240 is driven high upon actuation of any of the numbered pushbuttons 54321. The output of the gate 240 is applied to clock circuitry generally designated 242 comprising NOR gates 244 and 246, capacitors 248 and 250 and resistors 252 and 254. The output of the clock 242 is applied to the clock input of each of the registers 202–210, the output of the gate 240 is also applied to a power flip-flop generally designated 256 comprising NOR gates 258 and 260. One input to the gate 260 is from an initialization circuit 261 comprising a capacitor 262 and resistor 264 connected between B+ and ground. A second input to the gate 260 is tied to ground through a capacitor 266 which is isolated from B+ by a diode 268. The high side of the capacitor 266 is connected with a signal designated OKL through a resistor 270. The resistor 270 and capacitor 266 form a four second timer. The third input to the gate 260 is from the output of the gate 258 which is also fed to the reset terminal of the registers 202–210. The output of the gate 260 is connected with the base of a transistor 272 through a resistor 274. The transistor 272 has its emitter grounded and its collector connected through a resistor 276 to the base of a power transfer switching transistor 280. The emitter of the transistor 280 is connected to B+ while its collector is designated B+ SWD and is connected with the collector of a lamp driver transistor 282. Transistor 282 has its base connected with L and its emitter connected with the five lamps 43 (only one is shown) for illuminating the pushbuttons 5, 4, 3, 2 and 1. The voltage at the emitter of transistor 280 is regulated by a zener diode 286. The outputs of the gates 290 and 292 provide inputs to a NOR gate 294 the output of which is designated OKUL. OKUL is inverted by a NOR gate 296 and provides one input to a NOR gate 298 the other input to the gate 298 is from OKL. The output of the gate 298 is inverted by a NOR gate 300 to provide the output designated L. The output of the gate 294 provides one input to the gate 244 of the clock 242 for deenergizing the clock 242 after the proper combination has been inserted through the pushbuttons 5, 4, 3, 2, and 1.

The generation of the signal OKL will be described hereinafter. The operation of the combination lock circuitry is as follows assuming that OKL is low. Upon connection of the circuitry with the vehicle battery the initialization circuit 261 resets the power flip-flop 256 so that the output of the gate 260 is low and the output of the gate 258 is high thereby resetting the registers 202–210. Consequently, the inputs to the gates 290 and 292 are low and OKUL is low. Upon actuation of any of the pushbuttons 5, 4, 3, 2 and 1 the output of one of the gates 236 or 238 will go low driving the output of the gate 240 high and setting the power flip-flop 256 so that the output of the gate 258 goes low and the output of the gate 260 goes high. When OKUL is low, L is high so that when the output of the gate 260 goes high the transistors 272, 280 and 282 are energized illuminating pushbuttons 5, 4, 3, 2 and 1. The output of predetermined stages of the registers 202–210 are connected with NAND gates 290 and 292. For example, stage 5 of register 202, stage 4 of register 210, stage 3 of register 204, stage 2 of register 208, and stage 1 of register 206 would be connected as input to the gates 290 and 292 if the combination were 51423. Each time a pushbutton is depressed the clock 242 clocks the registers 202–210 so that if the proper combination 51423 is entered the output of the appropriate stages of the registers 202–210 go high switching the output of the gates 290 and 292 low and driving OKUL high. When OKUL goes high the output of the gate 244 of the clock 242 is held low. Since OKL is low and OKUL is low the output of the gate 298 goes high and L goes low rendering the transistor 282 nonconductive. Thus the output L is switched from a locked logic level to an unlocked logic level in response to actuation of the pushbuttons 5, 4, 3, 2, 1 in the predetermined sequence, namely 51423.

Referring to FIG. 9a, control circuitry responsive to the combination lock circuitry 200 comprises a speed switch generally designated 302 which includes a movable contact 304 connected with B+ through a resistor 306. The speed switch 302 develops an output signal designated SS3 in the position shown which represents a vehicle speed below 3 miles per hour. When the vehicle speed exceeds 3 miles per hour causing the movable contact 304 to engage the stationary grounded contact of the speed switch 302, SS3 goes low.

The vehicle alternator generally designated 310 develops a signal designated A at its R terminal which is high when the vehicle engine is running and switches low when the vehicle engine is not running. The R terminal of the alternator 310 is connected through a filter network comprising resistor 312 and a capacitor 314 to ground and the voltage at the R terminal is regulated by a zener diode 316. A STOP flip-flop generally designated 318 comprises a pair of NOR gates 320 and 322. The flip-flop 318 is reset from the output of the clock 242 during the entering of the combination code number so that the output of the gate 322 is low and the output of the gate 320 is high. One input to each of the gates 320 and 322 are tied to ground through respective pull down resistors 321 and 323. The flip-flop 318 is set by actuation of the STOP pushbutton which causes the output of the gate 320 to go low and the output of the gate 322 to go high. The flip-flop 318 is also reset by actuation of the N-START pushbutton which switches the output of the gate 322 low and the output of the gate 320 high. The output of the gate 320 provides one input to a NOR gate 324 the other input of which is from the speed switch 302. The output of the gate 324 provides one input to an ignition flip-flop 326 comprising NOR gates 328 and 330. The output of the gate 328 is connected with the base of a transistor 332 which controls a relay 334 having contacts (not shown) which are closed upon energization of the relay 334 to connect the ignition circuit of the vehicle to the battery. The relay 334 is shunted by the usual transient suppression diode 336. The output of the gate 328 also controls door lock solenoid control circuitry through a diode 340 connected with the base of a transistor 342 having its collector connected to B+ SWD and its emitter connected to a solenoid 344 which controls a conventional locking mechanism for locking the vehicle doors. The transistor 342 may also be controlled from the output of the alternator 310 through a diode 345. The output of the gate 330 is connected with the base of a transistor 346 having its collector connected to B+ SWD and its emitter connected with a door unlocking solenoid 348 for unlocking the conventional door locking mechanism. The output of the lock circuitry 200 designated L is applied as a third input to the gate 328 through a 2 second time delay circuit 352 comprising resistor 354 and capacitor 356.

The starter circuit of the vehicle is controlled by a NOR gate 358 having inputs connected with L and A. The gate 358 also has an input connected to ground through a resistor 360 and an inverter formed by a NOR gate 362. This input is normally high due to the inverter 362 but is driven low upon actuation of the PARK-START pushbutton. The N-START pushbutton is OR'ed with the PARK-START pushbutton through a diode 364 and with the STOP pushbutton through a diode 368 so that the output of the gate 362 goes low in response to actuation of either the STOP, PARK-START, or N-START pushbuttons. Another input to the gate 358 is from the PARK travel switch 112 or the NEUTRAL travel switch 114 through a NOR gate 370. The inputs to the NOR gate 370 designated PTI is tied to ground through a pull down resistor 372 so that this input is low when the PARK-TRAVEL switch is in an actuated position as shown and goes high in response to actuation of the PARK slide member 44 from a deactuated to an actuated position. The other input to the gate 370 designated NTI is connected to ground through a pull down resistor 374 and is normally low when the NEUTRAL travel switch 114 is in a deactuated position as shown but is driven high in response to actuation of the NEUTRAL slide member 48 from a deactuated to an actuated position. The output of the gate 358 is connected to the base of a transistor 376 having its collector connected at B+ SWD and its emitter connected to ground through a starter relay 377 shunted by the usual transient suppression diode 379. The relay 377 controls normally open contacts in the starter circuit of the vehicle so that upon energization of the relay 377 its contacts are closed to connect the starter motor solenoid to the vehicle battery. The various inputs to the gate 358 inhibit starting of the vehicle unless the combination code number has been properly inserted through the pushbuttons 5, 4, 3, 2, and 1 since until this occurs L is high and the output of the gate 358 is low. After the proper combination is entered the vehicle may be started if either the PARK-START or N-START pushbuttons are actuated while the PARK travel switch 112 or the NEUTRAL travel switch 114 are in an actuated position indicative of the vehicle transmission being in a PARK or NEUTRAL position. The starter circuit of the vehicle is deenergized after the engine is started since at this time the output of the alternator 310 will be high driving the output of the gate 358 low. The latch solenoid 126 which controls the latch arm 128 is shunted by the usual transient suppression diode 375 and is energized from a power switching transistor 376 connected with the output of a NOR gate 378 through an amplifying transistor 380. The inputs through the gate 378 are L and SS3. A third input to the gate 378 is from the output of a NOR gate 382. One input to the gate 382 is tied to ground through a pull down resistor 385 and is driven high in response to actuation of any of the pushbuttons R, D, $L_2$ or $L_1$. The other input to the gate 382 is normally held low by pull down resistor 360 but is driven high in response to actuation of any of the pushbuttons STOP, PARK-START, or N-START. The SS3 input to the gate 378 is from an inverter formed by NOR gate 384 having its input connected with the speed switch 302.

The latch solenoid 126 is maintained in a deenergized state thereby preventing the movement of the PARK slide member 44 from an actuated position until the combination code number is inserted through the pushbuttons 5, 4, 3, 2, and 1 since until this occurs L is high and the output of the gate 378 is low. As previously indicated none of the DRIVE positions of the transmission can be entered as long as the PARK slide member 44 is locked in an actuated position. After the proper combination is entered, L will go low and since the vehicle speed is below 3 miles per hour, SS3 will be low. Consequently, upon depression of any of the pushbuttons R, D, $L_1$, or $L_2$ the output of the gate 378 will be driven high energizing the solenoid 126 and permitting movement of any of the slide members 48, 50, 52, or 54 to place the transmission in a DRIVE position.

The PARK-START pushbutton is periodically illuminated upon operator entry of the combination code number by means of circuitry for controlling the lamp 45a located in the pushbutton housing 32. The lamp 45a is controlled from a transistor 392 having its collector connected at B+ SWD and its base connected with the output of a NOR gate 394. One input of the gate 394 is designated $\overline{PTI}$ and is connected with ground through a pull down resistor 396. $\overline{PTI}$ goes low upon actuation of the PARK travel switch 112 in response to movement of the PARK slide member 44 to an actuated position. The other input to the gate 394 is from an oscillator generally designated 398 comprising NOR gates 400 and 402. The inputs to the NOR gates 402 are normally held low through a pull down resistor 404 and are connected with the output of the gate 400 through a capacitor 406. One input to the gate 400 is normally held low through a pull down resistor 408 and is connected with the output of the gate 402 through capacitor 410. The other inputs to the gate 400 are A and L. If the PARK travel switch 112 is in an actuated position the gate 394 is open so that during entry of the combination code number, while L is still high, the output of the gate 400 is low and the output of the gate 394 goes high to continuously illuminate the PARK-START lamp 45a indicating that the transmission is in the PARK position. The output A is normally low when the engine is not running so that when the combination code is entered, L is driven low causing the output of the gate 400 to go high. The charging of the capacitors 406 and 410 cause the output of the gate 400 to oscillate. During the half cycle when the output of the gate 400 is low the output of the gate 394 is driven high to energize the lamp 45a and during the half cycle of the output of the gate, 400 is high the lamp 45a is deenergized. Consequently, the PARK-START pushbutton is periodically illuminated upon entry of the proper combination code number thereby directing the driver to depress the PARK-START pushbutton to start the vehicle.

The N-START pushbutton is periodically illuminated from the oscillator 398 in the event the vehicle engine stalls in a DRIVE position indicating to the driver to depress the NEUTRAL slide member 48 and in the process thereof actuate the N-START pushbutton. The output of the oscillator 398 provides one input to a NOR gate 416 the output of which controls the conduction of a transistor 418 having its emitter connected with the lamp 45b located in the housing 34 and its collector connected to B+ SWD. The other inputs to the gates 416 are from the output of a NOR gate 419 one input of which is designated NTI which is normally held low through the pull down resistor 374 and is driven high upon actuation of the NEUTRAL travel switch 114. The other input to the gate 419 is when the output of a NOR gate 420 having inputs connected with L and A. The other inputs to the gates 420 is from the output of the NOR gate 422 having inputs connected with each of the travel switches 116, 118, 120 and 122. If the NEUTRAL travel switch 116 is actuated then $\overline{PTI}$ is high closing the gate 394. If the engine stalls while the transmission is in one of the DRIVE positions one of the travel switches 116, 118, 120 or 122 will be actuated causing the output of the gate 422 to be low. L was low at the time the engine stalled so that when A goes low upon engine stalling the output of the gate 420 goes high and the output of the gate 418 goes low opening the gate 416 so that the output of the oscillator 398, which was energized at the time A went low, flashes the N-START lamp 45b through the transistor 418 to inform the driver to place the transmission in the NEUTRAL position. In the process of so doing the N-START pushbutton is actuated to start the vehicle. With the transmission in the NEUTRAL position the NEUTRAL travel switch 114 is actuated so that the output of the gate 419 is low and consequently when the oscillator 398 is deenergized when A goes high upon starting of the vehicle, the output of the gate 416 is held high to continuously energize the lamp 45b to indicate that the transmission is in the NEUTRAL position. Indicator lamps 45c, 45d, 45e and 45f are connected with the stationary contacts of the R, D, $L_2$ and $L_1$ travel switches respectively for continuously illuminating these pushbuttons when the transmission is placed in the respective positions.

The STOP pushbutton lamp 45g is energized through a transistor 434 having its collector connected to B+ SWD and its base connected to the output of an oscillator generally designated 436. The oscillator 436 comprises NOR gates 438 and 440 interconnected by capacitors 441 and 443. The inputs to gates 438 is connected to ground through a pull down resistor 447 while one input of the gate 440 is connected to ground through a pull down resistor 449, the other inputs to gates 440 is from the output of a NOR gate 442. One input to gate 442 is from a NOR gate 444 which has inputs connected with SS3, the output of the gate 320 of flip-flop 318, and PTI which is normally held low through the pull down resistor 272 but is driven high upon movement of the PARK slide member 44 to an actuated position. The other input to the gate 442 from the output of the NOR gate 445. One input to the gate 445 is $\overline{PTI}$ which is high when the PARK travel switch 112 is deactuated. The other input to the gate 445, designated $\overline{SH'}$, is the output of a shift history flip-flop 446 comprising NOR gates 448 and 450. The shift history flip-flop 446 is set when L is high just prior to entry of the combination code number to start the vehicle, and is reset from the gate 422 through an inverter formed by a NOR gate 452 when the transmission is placed in either the R, D, $L_2$ or $L_1$ positions. One input to the gate 448 is the output of the gate 322 of the STOP flip-flop 318. A second input to the gate 448 is tied to ground through a resistor 454 and is connected with L through a capacitor 456.

The STOP lamp 45g is flashed by the oscillator 436 if the STOP pushbutton is pushed while the vehicle speed is below 3 miles per hour and the PARK slide member 44 is not moved to an actuated position. The STOP lamp 45g is also flashed by the oscillator 436 if the PARK slide member 44 is moved to an actuated position subsequent to selection of one of the DRIVE positions R, D, $L_2$ or $L_1$ but the STOP pushbutton has not been actuated as would occur if the operator engages only the PARK pushbutton in pushing the PARK slide member 44 to the actuated position. In the first instance the output of the gate 444 goes high and in the second instance the output of the gate 445 goes high. In either case the engine will continue to run and the intent of flashing the stop light 45g is to call the driver's attention to the situation so that the driver will depress the STOP pushbutton and complete the engine turnoff.

L is switched high to energize the latch solenoid 126 and lock up the transmission, ignition circuit, and starter circuit by the signal OKL which is the output of a NOR gate 458 having inputs connected with the output of the gate 320 in the STOP flip-flop 318 and the PARK travel switch 112. If the PARK slide member 44 is moved to an actuated position and the STOP pushbutton is depressed all inputs to the gate 458 will be low causing OKL to go high. When OKL goes high the power flip-flop 256 is reset and the output of the gate 298 goes low causing L to go high resetting the shift history flip-flop 446.

The operating sequence for starting the vehicle engine when the system is in a locked condition is as follows. By pushing any of the numbered pushbuttons the combination lock electronics 200 is energized and the combination buttons numbered 1–5 are illuminated. Upon entry of the proper combination lock number the PARK-START pushbutton is periodically illuminated and the light illuminating the combination numbers is extinguished and the solenoid 126 is energized to allow shift selection and steering after leaving the PARK position. By pushing the PARK-START button the transmission is shifted to PARK position if not already in PARK (no parking brake release occurs since the engine hasn't started), and starts the engine. If the engine stalls when in PARK position the PARK-START pushbutton is periodically illuminated until the engine is restarted by pushing the PARK-START button again. By pushing any of the transmission selector pushbuttons fully in to the latched position, the desired shift position may be selected and the pushbutton will be illuminated. Upon selection of NEUTRAL or any DRIVE position while the engine is running the parking brake will be released as the PARK slide member 44 returns to its deactuated position through operation of the servo unit 190. If the engine stalls in any shift position other than PARK, the N-START pushbutton will be periodically illuminated and the engine may be restarted simply by pushing the N-START pushbutton. Engine operating condition is continually sensed and the gate 358 is closed once the engine has started to prevent engaging the starter motor when selecting shift positions of either PARK or NEUTRAL while the engine is running.

The normal operational sequence for stopping the vehicle is as follows. By pushing both the P-START and STOP pushbuttons fully in until latched, the transmission manual valve is moved to PARK and the parking brake assemblies are hydraulically applied by the piston assembly 142, and air is switched to the servo motor 190 controlling the pawl 194 thereby holding the parking brake pedal 140 in the position set. If only the PARK pushbutton is depressed the engine will not stop and the STOP pushbutton with be periodically illuminated. If the STOP pushbutton is pushed along with the PARK-START pushbutton then the following operations also occur. The engine is stopped a fixed time interval (about 1 second) after the STOP and PARK-START pushbuttons are depressed and latched and operates the PARK slide member locking solenoid 126 locking the PARK slide member in the actuated position and thus locking the steering wheel. If the engine is stopped in the normal stopping sequence the combination must be reentered to start the vehicle engine.

An alternate stopping sequence may be obtained by placing the PARK slide member in an actuated and latched position through depression of the PARK-START pushbutton without depressing the STOP pushbutton while the vehicle speed is below 3 miles per hour. In this event the parking brake will be applied and the steering wheel will be locked but the engine will not be stopped and the STOP pushbutton will be periodically energized. The engine may be stopped and the ignition system locked by simply pushing the blinking STOP pushbutton.

An emergency engine stopping mode of operation may be entered when the vehicle is traveling in excess of three miles per hour by simply touching the STOP pushbutton. In this event the N-START pushbutton will be periodically illuminated. Neither the PARK nor REVERSE pushbutton may be pushed in until the car slows to less than 3 miles per hour.

Having thus described my invention what I claim is:

I claim:

1. Motor vehicle anti-theft apparatus comprising:
    selector means for the automatic transmission of said vehicle including a slide member coupled with said transmission for placing the transmission in a PARK position upon predetermined sliding movement thereof from a deactuated position to an actuated position, travel switch means actuable by said slide member upon said predetermined movement, STOP pushbutton momentary switch means and START pushbutton momentary switch means mounted on the operator actuable end of said slide member and selectively actuable in either the actuated or deactuated position of said slide member, said STOP and START switch means being selectively but automatically actuated upon operator actuation of said slide member, electrically operated latch means for preventing movement of said slide member to or from said actuated position;

vehicle speed switch means for developing an output which switches between a first logic level when the vehicle speed is below a predetermined speed and a second logic level when the vehicle speed is above said predetermined speed;

electronic combination lock means including a plurality of operator actuable switch means, for developing an output which switches from a LOCKED logic level to an UNLOCKED logic level in response to actuation of said operator actuable switch means in a predetermined sequence;

first gate means for energizing the ignition circuit of said vehicle in response to actuation of said START switch means while the output of said lock means is at said UNLOCKED level and for deenergizing said ignition circuit in response to switching of the output of said lock means from said UNLOCKED level to said LOCKED level;

second gate means for energizing the starter circuit of said vehicle in response to actuation of said START switch means while the output of said lock means is at said UNLOCKED level and said travel switch is in an actuated position;

third gate means for energizing said latch means in response to actuation of said START switch means while the output of said speed switch means is at said first level to permit movement of said slide member, said third gate means deenergizing said latch means to prevent movement of said slide member whenever the output of said gate means is at said LOCKED logic level;

fourth gate means for switching the output of said lock means to said LOCKED level in response to actuation of said STOP switch means and said travel switch means.

2. Apparatus as defined in claim 1 further including means responsive to a vehicle engine running condition for developing a first logic level output when said engine is running and a second logic level output when said engine is not running;

lamp means energizable to illuminate the pushbutton of said START pushbutton switch means;

oscillator means for periodically energizing said lamp means to periodically illuminate said START pushbutton;

fifth gate means for energizing said oscillator means in response to the switching of the output of said lock means to said UNLOCKED level while said travel switch means is actuated, said fifth gate means deenergizing said oscillator means in response to said first logic level output of said engine condition responsive means.

3. Apparatus as defined in claim 2 further including:

additional lamp means energizable to illuminate the pushbutton of said STOP pushbutton switch means;

additional oscillator means for periodically energizing said additional lamp means to periodically illuminate said STOP pushbutton;

sixth gate means for energizing said additional oscillator means in response to actuation of said travel switch in the absence of actuation of said STOP switch means, said sixth gate means deenergizing said oscillator means in response to actuation of said STOP switch means.

4. Motor vehicle anti-theft apparatus comprising:

selector means for the automatic transmission of the vehicle including first and second slide members coupled with said transmission for respectively placing the transmission in a NEUTRAL position and a DRIVE position upon predetermined sliding movement thereof from a deactuated position to an actuated position, first and second travel switch means respectively actuable by said first and second slide members upon said predetermined movement, STOP pushbutton momentary switch means and START pushbutton momentary switch means mounted on the operator actuable end of said first slide member, DRIVE pushbutton momentary switch means mounted on the operator actuable end of said second slide member, said pushbutton switch means being selectively actuable in either the actuated or deactuated positions of said slide members, automatically releasable latch means responsive to movement of a slide member to said actuated position for latching the slide member in the actuated position and for releasing a previously latched slide member, means normally biasing the slide members to a deactuated position;

electrically actuated latch means having a deactuated state preventing movement of said first slide member to or from said actuated position to prevent movement of said second slide member to said actuated position while said first slide member is in said actuated position;

vehicle speed switch means for developing an output which switches between a first logic level when the vehicle speed is below a predetermined speed and a second logic level when the vehicle speed is above said predetermined speed;

means responsive to a vehicle engine running condition for developing a first logic level output when said engine is running and a second logic level output when said engine is not running;

electronic combination lock means, including a plurality of pushbutton switch means for developing an output which switches from a LOCKED logic level to an UNLOCKED logic level in response to actuation of said plurality of pushbutton switch means in a predetermined sequence;

first gate means for energizing the ignition circuit of said vehicle in response to actuation of said START switch means while the output of said logic means is at said UNLOCKED level and for deenergizing said ignition circuit in response to switching of the output of said lock means from said UNLOCKED level to said LOCKED level;

second gate means for energizing the starter circuit of said vehicle in response to actuation of said START switch means while the output of said lock means is at said UNLOCKED logic level and said first travel switch is in an actuated position;

third gate means for energizing said latch means in response to actuation of said DRIVE switch means while the output of said lock means is at said UNLOCKED level to permit movement of said second slide member to said actuated position, said third gate means deenergizing said latch means to prevent movement of said first slide member from said actuated position whenever the output of said lock means is at said LOCKED logic level;

fourth gate means for switching the output of said lock means to said LOCKED logic level in response to actuation of said STOP switch means and said first travel switch means.

5. Apparatus as defined in claim 4 further including lamp means energizable to illuminate the pushbutton of said STOP pushbutton switch means;
oscillator means for periodically energizing said lamp means;
fifth gate means for energizing said oscillator means in response to actuation of said first travel switch means subsequent to actuation of said second travel switch means in the absence of actuation of said STOP switch means, said fifth gate means de-energizing said oscillator means in response to actuation of said STOP switch means.

6. Apparatus as defined in claim 4 further including:
lamp means energizable to illuminate the pushbutton of said STOP pushbutton switch means;
oscillator means for periodically energizing said lamp means;
fifth gate means for energizing said oscillator means in response to actuation of said STOP switch means while said first travel switch is in a deactuated position and the output of said speed switch is at said first logic level, said fifth gate means deenergizing said oscillator means in response to actuation of said first travel switch means.

7. Apparatus as defined in claim 4 wherein said selector includes a third slide member coupled with said transmission for placing the transmission in a reverse position upon predetermined sliding movement thereof from a deactuated position to an actuated position;
said electrically actuated latch means when in said deactuated state preventing movement of said third slide member from said deactuated position to said actuated position.

8. The apparatus defined in claim 4 wherein said selector means includes a third slide member coupled with said transmission for placing the transmission in a neutral position upon predetermined sliding movement thereof from a deactuated position to an actuated position, a third travel switch means actuable by said third slide member upon said predetermined movement;
additional start pushbutton momentary switch means mounted on the operator actuable end of said third slide member and selectively actuable in either the actuated or deactuated position of said third slide member,
lamp means energizable to illuminate the pushbutton of said additional start pushbutton switch means;
oscillator means for periodically energizing said lamp means;
fifth gate means for energizing said oscillator means when the output of said engine running condition means switches from said first logic level to said second logic level while the output of said lock means at said UNLOCK level and said second travel switch means is in an actuated position.

9. Apparatus as defined in claim 4 further including means responsive to actuation of said first travel switch means for actuating the parking brake assembly of said vehicle and means responsive to movement of said first slide member from said deactuated position to said actuated position to release said emergency brake assembly.

10. The apparatus defined in claim 4 further including steering wheel lock means for preventing rotation of the steering wheel of the vehicle and means for actuating said steering wheel lock means in response to movement of said first slide member to an actuated position.

* * * * *